(12) United States Patent  
Meinders

(10) Patent No.: US 7,746,356 B2  
(45) Date of Patent: Jun. 29, 2010

(54) VISUAL CONTENT SIGNAL DISPLAY APPARATUS AND A METHOD OF DISPLAYING A VISUAL CONTENT SIGNAL THEREFOR

(75) Inventor: Erwin Rinaldo Meinders, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 812 days.

(21) Appl. No.: 10/568,371

(22) PCT Filed: Aug. 5, 2004

(86) PCT No.: PCT/IB2004/051400  
§ 371 (c)(1),  
(2), (4) Date: Feb. 14, 2006

(87) PCT Pub. No.: WO2005/017739  
PCT Pub. Date: Feb. 24, 2005

(65) Prior Publication Data  
US 2006/0268363 A1 Nov. 30, 2006

(30) Foreign Application Priority Data  
Aug. 19, 2003 (EP) .................. 03102594

(51) Int. Cl.  
*G09G 5/00* (2006.01)

(52) U.S. Cl. .................. 345/629; 345/1.1; 382/190

(58) Field of Classification Search .............. 345/629, 345/634, 1.1; 382/190  
See application file for complete search history.

(56) References Cited

U.S. PATENT DOCUMENTS 2,383,493 A 8/1945 Mercer 5,187,586 A 2/1993 Johnson  
(Continued)

FOREIGN PATENT DOCUMENTS

DE 4222538 A1 1/1994  
(Continued)

OTHER PUBLICATIONS

Chabane Djeraba, "Content-Based Multimedia Indexing and Retrieval", IEEE Multimedia, Institute of Electrical and Electronic Engineers, Apr.-Jun. 2002.  
(Continued)

*Primary Examiner*—M Good Johnson

(57) ABSTRACT

The invention relates to a visual content signal display apparatus (100) comprising a receiver (101) which receives a visual content signal. The receiver (101) is coupled to a primary display processor (103) which is coupled to a primary display (105) and presents the visual content signal thereon. The receiver (101) is further coupled to an extraction processor (107) which extracts background content information from the visual content, signal. The background content information is fed to a secondary display processor (109) which generates a surround image on the basis of the extracted background content information. The surround image comprises visual characteristics corresponding to the visual characteristics of the image of the primary display (105). The display apparatus (100) further comprises a secondary display unit (111), coupled to the secondary display processor (109), and operable to display the surround image on a secondary display area whereby a combined display having an increased viewing angle is achieved. The surround image is preferably projected onto walls and ceiling of a room thereby providing an enhanced viewing experience.

20 Claims, 2 Drawing Sheets

U.S. PATENT DOCUMENTS

Figure 1:
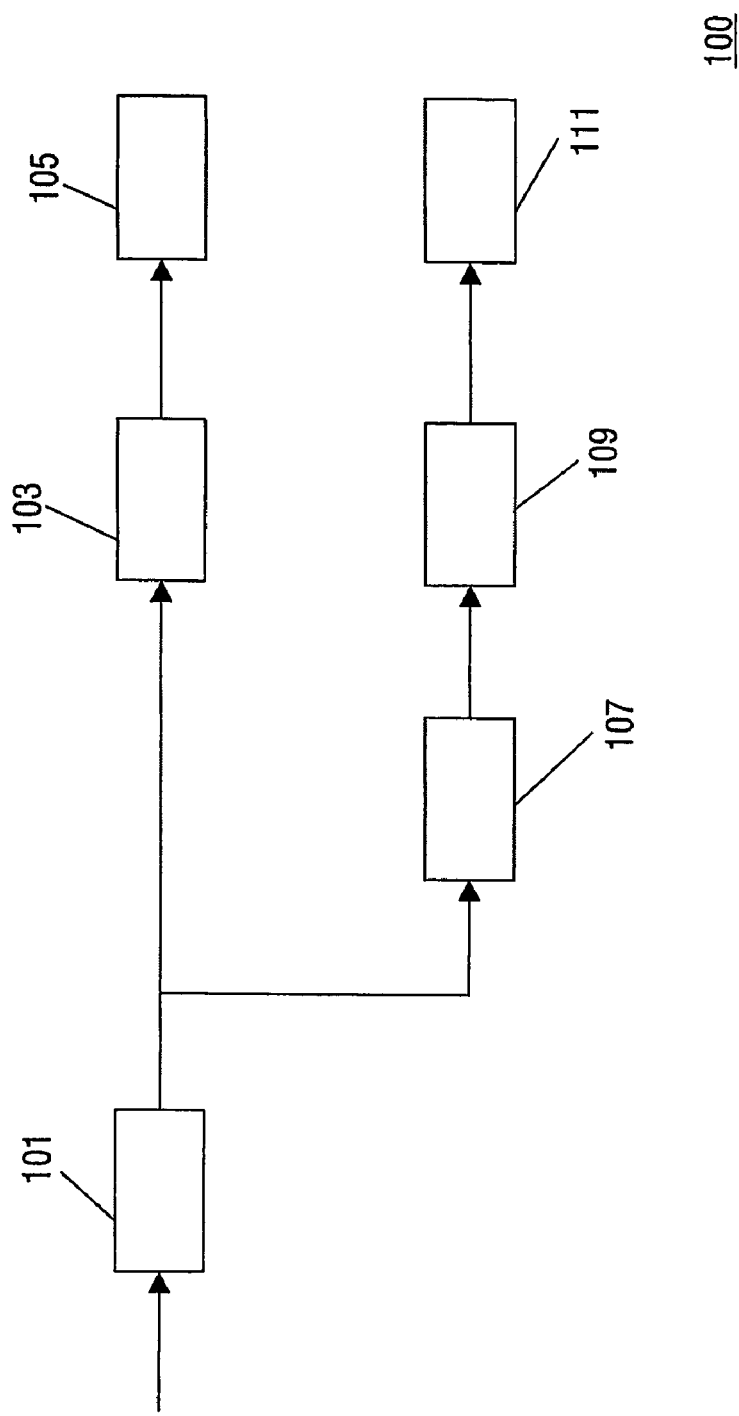

| | | |
|---|---|---|
| 5,963,247 A | 10/1999 | Banitt |
| 6,195,068 B1 * | 2/2001 | Suzuki et al. ................ 345/2.2 |
| 6,335,985 B1 * | 1/2002 | Sambonsugi et al. ........ 382/190 |
| 6,445,365 B1 * | 9/2002 | Taniguchi et al. .............. 345/9 |
| 6,490,011 B1 | 12/2002 | Cooper et al. |
| 6,906,762 B1 * | 6/2005 | Witehira et al. ............... 349/73 |
| 2002/0105620 A1 | 8/2002 | Goulden et al. |
| 2002/0167531 A1 | 11/2002 | Baudisch |

FOREIGN PATENT DOCUMENTS

| | | |
|---|---|---|
| GB | 2308036 A | 6/1997 |
| WO | 2005017739 A1 | 2/2005 |

OTHER PUBLICATIONS

Yoshika et al, "A Survey on Content-Based Retrieval for Multimedia Databases", IEEE Transactions on Knowledge and Data Engineering, vol. 11, No. 1, Jan./Feb. 1999, Institute of Electrical and Electronic Engineers.

N. Dimitrova et al, "Applications of Video-Content Analysis and Retrieval", IEEE Multimedia, Jul.-Sep. 2002, Institute of Electrical and Electronic Engineers.

* cited by examiner

VISUAL CONTENT SIGNAL DISPLAY APPARATUS AND A METHOD OF DISPLAYING A VISUAL CONTENT SIGNAL THEREFOR

The invention relates to a visual content signal display apparatus and a method of displaying a visual content signal therefor and in particular to a system for enhancing a primary display.

In recent years, the variety and quantity of content that may be provided to consumers have increased significantly with more content being available through an increasing number of distribution mediums including for example satellite TV broadcasts, Digital Versatile Disc (DVD), cable broadcast and terrestrial TV.

In addition to the increased quantity of content and the increased distribution flexibility, a significant effort has been made by the content provision industry to improve the user experience for audiovisual content. For example, the advent of digital video distribution such as digital TV or DVD has resulted in a significantly improved quality of the pictures and sounds that can be produced in a domestic environment. Furthermore, the advent of widescreen TVs and in particular flat screen TVs has led to an increased prevalence of large screen TVs having aspect ratios closer resembling those found in for example cinemas.

As another example of an increased user experience is the advent of home cinema and in particular of surround sound where a number of speakers (typically five or seven directional speakers plus a subwoofer for bass effects) are situated around a listening position thereby providing an immersed audio experience.

It has also been suggested that improved user experience may be achieved by providing a broader viewing angle for a user. For example, cinemas are known which utilise a large semi-spherical screen which partially surrounds the user. An example is the IMAX theatre performances. However, these are very large, expensive and impractical for most practical (domestic) environments.

U.S. Pat. No. 5,963,247 discloses a visual display system wherein composite three-dimensional-like image sequences are generated by assembling two or more separate image sequences. In the described system, separate image sequences are recorded and projected on to different screens. The screens are positioned and the separate image sequences synchronised such that a viewer sees a composite picture extending over the two or more screens.

However, the system of U.S. Pat. No. 5,963,247 tends to have a number of associated disadvantages including the following. Firstly, the system is rather complex and requires processing of a plurality of separate image sequences. This processing is required both for transmission and reception of the image sequences. Furthermore, more than one image sequence must be recorded which requires additional equipment and introduces additional inconveniences and tasks associated with the recording. Similarly, a plurality of image sequences must be distributed which increases the required bandwidth and uses additional distribution resource. This may prevent distribution in existing communication systems having a limited available bandwidth. Also, as conventional visual content signals such as e.g. films or TV programmes do not comprise a plurality of separate correlated image sequences, the enhanced viewing experience cannot be achieved for existing content signals. Additionally, the system requires more than one screen as well as an accurate relative positioning of the screens in order to achieve the required spatial synchronisation.

Hence, an improved visual content signal display system would be advantageous and in particular a system allowing for increased user experience, increased flexibility, reduced complexity, reduced cost, increased backwards compatibility and/or facilitating recording of a content signal would be advantageous.

Accordingly, the Invention preferably seeks to mitigate, alleviate or eliminate one or more of the above mentioned disadvantages singly or in any combination.

According to a first aspect of the invention, there is provided a visual content signal display apparatus comprising: means for receiving a visual content signal; means for presenting the visual content signal on a primary display; means for extracting background content information from the visual content signal; means for generating a surround image in response to the background content information; and means for displaying the surround image on a secondary display area thereby providing a combined display having an increased viewing angle.

The invention allows for an increased user experience by providing a combined display with an increased viewing angle. For example, the secondary display area may partially or substantially or even fully surround one or more viewers thereby providing a more absorbing viewing experience. The viewing experience may provide a surround image experience compatible with a surround sound experience thereby providing a truly immersing audiovisual experience. The secondary display area need not consist in one or more screens or dedicated display elements but may use any suitable area.

The image of a primary display may be extended by use of background content information of a content signal being presented on the primary display thereby obviating or mitigating requirements for separate image sequences. Hence, a visual content signal display apparatus having low complexity and/or high flexibility may be obtained. Specifically, a display apparatus suitable for domestic use and the consumer market may be enabled or facilitated.

Furthermore, recording and distribution of signals are significantly facilitated as only a single content signal needs to be recorded and generated. Also, the visual content display apparatus may be fully backwards compatible and may be used with existing recording, transmit, broadcasting and/or distribution means and can be used with existing content signals. For example, the visual content display apparatus may be used to enhance the viewing experience of traditional TV broadcasts or DVD content.

It will be appreciated that the surround image is preferably not a static image but a dynamic surround image sequence associated with the visual content signal displayed on the primary display. The term image is used to include both singular static images as well as image sequences including for example video clips. Thus an image may comprise a single picture or may comprise a plurality of subsequent pictures e.g. providing a video sequence.

According to a feature of the invention, the means for displaying the surround image is operable to project the surround image onto an external surface of an object.

The secondary display area may be an external surface of a suitable object and specifically may not be an object dedicated for presenting the surround image. Rather the surround image may be projected on available surfaces thereby reducing cost, complexity and/or size of the visual content display apparatus. Furthermore, it mitigates any requirements for dedicated screens or setups required for displaying the surround image and thus facilitates deployment.

According to a different feature of the invention, the external surface is an internal surface of a room. This provides for a particularly simple visual content display apparatus providing an enhanced viewing experience. The viewing experience may be improved as external surfaces of a room provide a suitable source for displaying a surround image and particularly for providing a surround experience. It furthermore facilitates deployment. The internal surface may preferably be one, more or all of the floor, ceiling and walls of a room.

According to a different feature of the invention, the means for extracting is operable to extract real time background content information from the visual content signal, and the means for generating the surround image is operable to generate a real time surround image in response to the real time background content information.

The surround image may be dynamically varied to reflect the content signal displayed on the primary display. Thus a dynamically changing image may be presented which extends beyond that of the primary display and of the received visual content signal thus providing an improved viewing experience. The surround image may specifically change with scene changes and other changes in the background of the primary display thus providing a surround image which closely follows the image of the primary display thereby enhancing the continuity of the combined display.

According to a different feature of the invention, the means for extracting is operable to extract the background content information in response to background meta-data comprised in the visual content signal. The visual content signal may specifically comprise meta-data which indicates the current background. For example, the meta-data may indicate that the visual content signal is of a football match which may be used to generate a surround image corresponding to e.g. a crowd of spectators. The meta-data may also directly indicate background characteristics or objects, e.g. the data may for example indicate that part of the primary display consists of a sky. This allows for a particularly low complexity and/or accurate way of generating the background content information.

According to a different feature of the invention, the means for extracting is operable to extract the background content information in response to a content analysis of the visual content signal. This allows for a fully automated extraction of background content information without requiring any additional information to be included. Thus, it ensures a high degree of backwards compatibility. For example, the content analysis may indicate that the visual content signal is of a football match which may be used to generate a surround image corresponding to e.g. spectators. The content analysis may for example alternatively or additionally determine specific visual characteristics of sections of the image of the primary display.

According to a different feature of the invention, the content analysis comprises image object recognition. The content analysis may specifically detect the presence of objects in the visual content signal. For example, the content analysis may indicate that a section of the image of the primary display comprises e.g. clouds, grass etc and this may be used to generate a suitable surround image.

According to a different feature of the invention, the means for generating a surround image is operable to perform motion estimation of an image object and to generate the surround image in response to the motion estimation. This allows for a suitable way of enhancing the surround image and to ensure increased continuity between the primary display and the surround image. For example, the movement of an object in the primary display may be tracked and continued in the surround image as the object reaches the edge of the primary display.

According to a different feature of the invention, the background content information comprises a visual characteristic of an image section of the visual content signal proximal to an edge of the primary display; the means for generating the surround image is operable to generate at least a partial surround image having a corresponding visual characteristic; and the means for displaying the surround image is operable to display the partial surround image proximal to the edge.

This allows for a high degree of continuity across an edge between the primary display and the secondary display area and therefore facilitates that a combined display is achieved which may be perceived as a single continuous image. Preferably, the content information comprises a visual characteristic of a plurality of image sections of the visual content signal proximal to different edges of the primary display, the means for generating the surround image is operable to generate a plurality of partial surround image sections which have a corresponding visual characteristic; and the means for displaying the surround image is operable to display the partial surround images proximal to the corresponding edges.

According to a different feature of the invention, the means for generating a surround image is operable to generate the surround image in response to a predetermined image associated with the background content information. This provides for a low complexity implementation. Specifically, the surround image or parts thereof may be generated by inclusion of a pre-stored image having similar visual characteristics. For example, a pre-stored image of a sky may be included in the surround image to extend an image section of the primary display comprising a sky. The characteristics of the predetermined image may be modified to reflect the corresponding image section of the primary display. For example, the brightness and colour saturation may be modified to reflect the image section.

According to a different feature of the invention, the means for generating the surround image is operable to generate the surround image in response to a predetermined default image if no valid background content information is determined. This allows for a neutral surround image to be presented if no appropriate background content information can be determined. The default image may specifically be a null surround image corresponding to no presentation of a surround image. This image may also be a colour, for example changing in brightness as a function of the viewing angle (or distance from primary display).

According to a different feature of the invention, the means for generating the surround image is operable to generate the surround image at a lower quality than a quality of the display of the content signal on the primary display.

The surround image or parts thereof may for example be of lower resolution than the primary display. This facilitates processing and/or reduces the requirements of the functionality for generating the surround image. Hence, for example, a reduced processing time or storage requirement e.g. for predetermined images may be achieved.

According to a different feature of the invention, means for generating the surround image is operable to generate the surround image with a quality that decreases for increasing distance (viewing angle) from the primary display. For example, the spatial resolution may be decreasing for increasing distance (viewing angle). The inventor has realised that the sensitivity to reduced quality reduces with increasing distance from the primary display and that accordingly the quality may be increased thereby reducing the complexity and cost of the involved equipment and/or processing.

According to a different feature of the invention, the means for generating the surround image is operable to generate the surround image in response to characteristics of a viewing environment associated with the secondary display.

For example the projected surround image may depend on an ambient brightness level in the viewing environment and/or the reflectivity and perhaps colour of any surfaces used for reflecting the surround image. Hence, an improved customisation for a specific viewing environment may be achieved. The characteristics of the viewing environment may be automatically determined or may for example be determined from a manual input by a user.

According to a different feature of the invention, the visual content signal display apparatus further comprises means for determining a category of the visual content signal and wherein the means for generating the surround image is operable to generate the surround image processing in response to the category.

The category of the visual content signal may for example relate to a genre of the content of the visual content signal. For example, different algorithms and processes may be used for generating the surround image depending on whether the content is action, sport, news or music concert content. Hence, this allows for a surround image to be generated which is optimised for the given category of visual content signal.

According to a second aspect of the invention, there is provided a method of displaying a visual content signal comprising the steps of: receiving a visual content signal; presenting the visual content signal on a primary display; extracting background content information from the visual content signal; generating a surround image in response to the background content information; and displaying the surround image on a secondary display area thereby providing a combined display having an increased viewing angle.

These and other aspects, features and advantages of the invention will be apparent from and elucidated with reference to the embodiment(s) described hereinafter.

Figure 2:
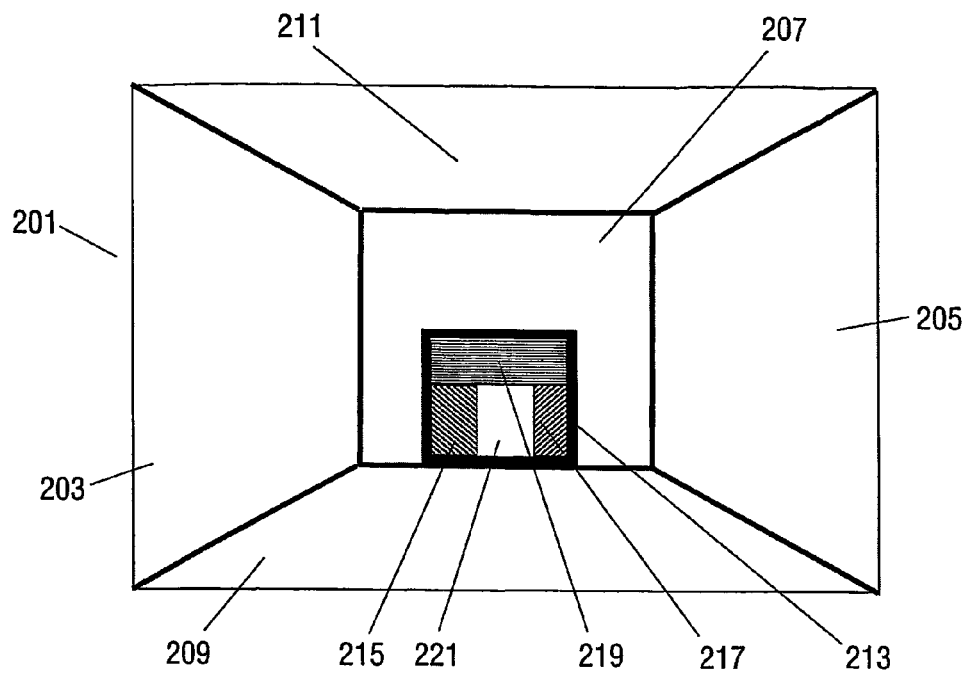
Figure 3:
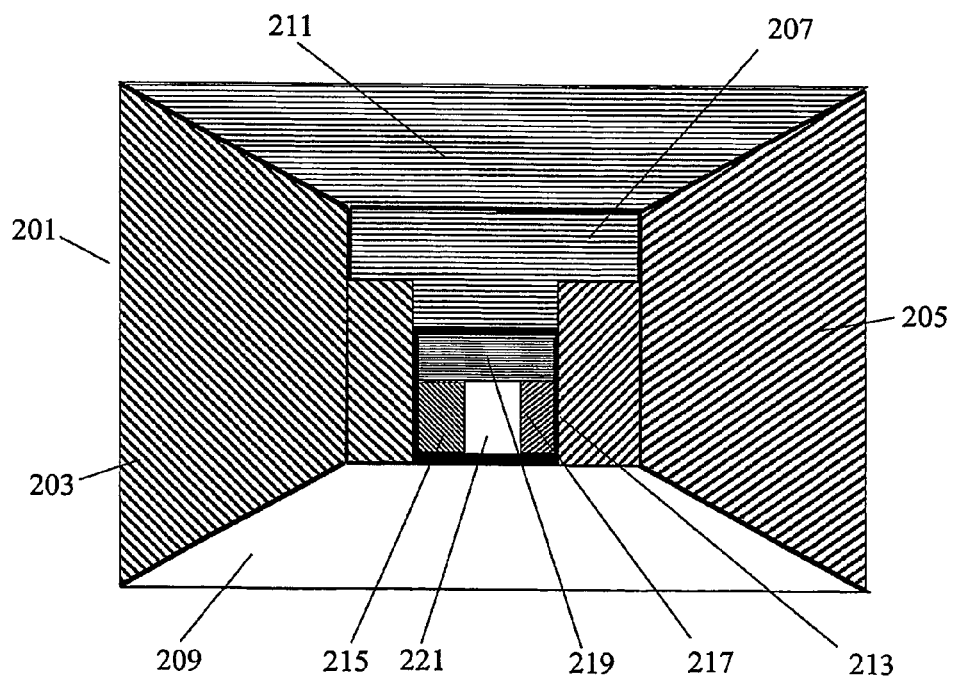

An embodiment of the invention will be described, by way of example only, with reference to the drawings, in which FIG. 1 illustrates a visual content display apparatus in accordance with an embodiment of the invention;

FIG. 2 illustrates a viewing arrangement comprising a TV display in accordance with prior art; and FIG. 3 illustrates a viewing arrangement comprising a visual content display apparatus in accordance with an embodiment of the invention.

The following description focuses on an embodiment of the invention applicable to a visual content display apparatus particularly suited for a domestic consumer environment but it will be appreciated that the invention is not limited to this application. For brevity, the term image has in the description been used to include both single frame images and multiple frame (e.g. moving) images and image sequences. For example, a surround image is not necessarily a single static image but may include a (potentially unlimited) image sequence e.g. corresponding to a video clip.

FIG. 1 illustrates a visual content display apparatus 100 in accordance with an embodiment of the invention.

The visual content display apparatus 100 comprises a receiver 101 which receives a visual content signal from a suitable source (not shown). The source may be external or internal and may for example by a TV broadcast signal or a DVD disc. The receiver 101 comprises all necessary functionality required for receiving the visual content signal and to extract or convert this into a suitable format. For example, for a TV broadcast signal the receiver 101 comprises all required functionality for amplifying, filtering demodulating and decoding the received radio signal to generate a base band visual content signal.

The visual content display apparatus 100 further comprises a primary display processor 103 coupled to the receiver 101, and a primary display 105 coupled to the primary display processor 103. The primary display processor 103 is operable to process the visual content signal and to control the primary display 105 to display the visual content signal. In the preferred embodiment, the receiver 101, primary display processor 103 and primary display 105 are equivalent to a conventional TV set and are operable to receive a standard TV visual content signal and to present in on the primary display 105.

In addition, the visual content display apparatus 100 comprises an extraction processor 107 which is coupled to the receiver 101 and which receives the base band visual content signal therefrom. The extraction processor 107 is operable to extract background content information from the visual content signal. The background content information relates to characteristics of the background of the image displayed on the primary display.

In the preferred embodiment, the extraction processor 107 extracts background content information by extracting meta-data which has been embedded in the visual content signal by the broadcaster. The meta-data comprises information which is indicative of the background of the image of the primary display. In the preferred embodiment, the background content information relates to image sections of the picture which forms the background of the scene displayed and thus of image sections which tend to be relatively static during the scene. For example, for a news broadcast, the news reader will be considered to be foreground whereas the remaining elements may be considered background. However, generally background content information may be considered relating to image segments which suitable can be extended and extrapolated beyond the edges of the primary display. When meta-data is used, the broadcaster may determine what is considered as background information by embedding the appropriate meta-data.

In the preferred embodiment, the meta-data relates to visual characteristics of the image of the primary display towards the different edges of the primary display. For example, meta-data may be extracted indicating that the image sections towards the upper edge of the primary display corresponds to a sky, image sections towards the lower edge of the primary display corresponds to grass and image sections towards the side edges of the primary display corresponds to grass and sky with a separation half way along the edge. Alternatively or additionally, the meta-data may provide data indicating a preferred background colour or texture or other visual characteristic.

The extraction processor 107 is coupled to a secondary display processor 109. The secondary display processor 109 is fed the extracted background content information and is operable to generate a surround image in response to this. The secondary display processor 109 is in the preferred embodiment coupled to a secondary display unit 111 which is operable to display the surround image by displaying it on a secondary display area which extends beyond the primary display 105.

In the preferred embodiment, the secondary display unit 111 comprises a display projector which is operable to project an image on an external surface. This surface may specifically be an external and preferably portable reflecting screen but is in the preferred embodiment a surface of existing objects in the viewing environment. Preferably the projector is operable to directly project the image on the walls, floor and/or ceiling of the room in which the primary display is situated.

Hence, the embodiment provides for a system wherein a surround image associated with the background of a received and displayed image can be projected on to a display area whereby the viewing angle may be extended significantly and an enhanced and immersed viewing experience can be provided.

To further illustrate the preferred embodiment, FIG. 2 illustrates a viewing arrangement comprising a TV display in accordance with prior art. FIG. 2 illustrates a room 201 having a first 203 and second 205 and third 207 wall, a floor 209 and a ceiling 211. The room comprises a primary display 213 which specifically may be a conventional flat screen TV mounted on the third wall 207.

The primary display 213 shows a film comprising a current image which for clarity and simplicity is illustrated as having four different image segments 215, 217, 219, 221. The first image segment 215 corresponds to the background of the image towards the edge of the primary display 213 which is closest to the first wall 203. The second image segment 217 corresponds to the background of the image towards the edge of the primary display 213 which is closest to the second wall 205. The third image segment 219 corresponds to the background of the image towards the edge of the primary display 213 which is closest to the ceiling 211. The fourth image segment 221 corresponds to the foreground of the image.

FIG. 2 illustrates the conventional viewing environment. A significant disadvantage of this viewing arrangement is that the viewing experience is limited by the small size of the primary display which not only reduces the impact of the displayed image due to the size of the image itself but also allows for a high number of visual distractions. For example, a significant difference between the emotional experience experienced in a cinema and in a home cinema or television apparatus is due to the much smaller viewing angle. Typically, a cinema screen is at least an order of magnitude larger in size than that of domestic consumer equipment. A wide viewing angle allows a viewer to be immersed in the scene and to be provided with more intense experiences.

FIG. 3 illustrates a viewing arrangement comprising a visual content display apparatus in accordance with the preferred embodiment of the invention. Specifically, FIG. 3 illustrates a viewing experience that may be provided by the visual content display apparatus 100 of FIG. 1.

In the example, the extraction processor 107 has determined that an image section 215 exists close to the edge of the primary display 213 extending towards the first wall 203. The characteristics of this image section are determined. For example, it may be determined that this image segment mainly comprises a green grassy background. Accordingly the secondary display processor 109 controls the secondary display unit 111 to project an image of green grass onto the first wall 203 and part of the third wall 207.

Likewise the second image segment 217 may also be determined as green and grassy and accordingly the secondary display unit 111 may project an image of green grass onto the second wall 205 and part of the third wall 207.

The extraction processor 107 may further determine that an image section 213 exists close to the upper edge of the primary display 213. The characteristics of this image section are determined as for example mainly comprising a blue sky with clouds. Accordingly the secondary display processor 109 controls the secondary display unit 111 to project an image of a cloud onto the ceiling 211 and part of the third wall 207.

Thus a viewer will in this case be presented with a partially surrounding image which has a much increased viewing angle compared to the original display. The surround image projected on to the walls and ceiling need not be an accurate match for the background of the image of the primary display or have a smooth and unnoticeable transition from the image of the primary display. Rather an improved viewer experience can be achieved even with rough approximations to the primary display image and in particular for some images a projection of associated colours may be sufficient for an enhanced experience.

As a specific example, if the primary display shows a person talking in the middle of a populated square of a city, buildings and other similar features may be projected onto the side walls, sky and clouds may be projected on the ceiling and pictures of streets with coloured mosaic may be projected onto the floor. In this way, the viewer may still see the main focused image on the primary display but will also, perhaps out of the corner of his eyes, see the facades of the houses at the sides and the clouds in the sky. In this way a surround image is created that provides a much more intense viewing experience.

The images projected may be derived from the different image sections for example by a suitable repetition, blurring and resampling of the image data of these image sections. Alternatively or additionally, existing pre-stored images may be used. For example, the visual content display apparatus may comprise a large number of pre-stored images corresponding to different possible background content characteristics. An image (including an image sequence) may e.g. be stored corresponding to a slightly cloudy sky, another image for a more clouded sky, another image for a sky with no clouds etc. Accordingly, the extracted background content information may be used to select a suitable image for a given image section and this may be projected onto the corresponding part of the display area.

In one embodiment, meta-data may thus be extracted from the visual content signal and used to select a suitable pre-stored image. This image may have characteristics amended to correspond to e.g. the brightness and colour saturation of the image of the primary display. The image may subsequently be merged with other images selected for other image segments and the combined surround image may be projected onto the walls and/or ceiling and/or floor of the room. Specifically, in some embodiments, the meta-data may directly indicate or identify a suitable image intended to be used with the visual content signal.

If no suitable background content information can be determined or equivalently if no surround image can be generated on the basis of the determined background content information, the visual content display apparatus preferably projects a default image. The default image may specifically be a null image corresponding to not projecting any image. However, in the preferred embodiment, the default image is an image which frames the primary display to produce a visually appealing display.

The secondary display unit 111 may preferably use a projector/beamer comprising a rotating polygon whereby images can be projected at several surfaces in the room. The projector can be placed behind the viewer, in front of the primary display, on the ceiling or in any suitable location. In some embodiments, a plurality of projectors may be used.

In the preferred embodiment, the processing and generation of the surround image is in real time. In this embodiment, background content information is extracted in real time from the visual content signal as and when it is received and this information is used to generate a surround image that is synchronous with the primary display. Preferably, any delay associated with the processing and generation of the surround image is compensated by the visual content signal being delayed equivalently for the primary display.

In some embodiments, background content information from previously shown images may be used to generate the surround image corresponding to a current image. This is particularly advantageous in embodiments where it is preferable not to delay the visual content signal of the primary display.

In some embodiments, the background content information may be extracted by content analysis of the visual content signal.

Content analysis may be based on detecting specific characteristics typical for a given category of content. For example, a video content item may be detected as relating to a football match by having a high average concentration of green colour and a frequent sideways motion. Cartoons are characterised by typically having strong primary colours, a high level of brightness and sharp colour transitions.

Thus video coding parameters may advantageously be used to determine the content of a video signal. For example, a high relative value of AC coefficients in a DCT transform block indicates that a sharp transition is likely to be comprised in the transform block. Such a transition is typical for a cartoon and may therefore be included as a video coding parameter that indicates that the current content is a cartoon. Typically, a significant number of parameters are considered and the content may be determined as the content category which most closely correlates with the determined characteristics. Thus, the colour saturation and luminance may further be included to determine if the current content is a cartoon. For example, if video coding data indicates a high degree of colour saturation, high luminance, a high concentration of energy in high frequency DCT coefficients as well as large uniform or flat picture areas, a content analysis algorithm may determine the current content as a cartoon.

Typically, both video coding parameters and non-video coding parameters may be used together for content analysis. For example, a high degree of motion, strong luminance and a rhythmic nature of an associated sound track may indicate that the current content is a music video.

Further information on content analysis is generally available to the person skilled in the art. For example, the articles "Content-Based Multimedia Indexing and Retrieval" by C. Djeraba, IEEE Multimedia, April-June 2002, Institute of Electrical and Electronic Engineers; "A Survey on Content-Based Retrieval for Multimedia Databases" by A. Yoshika et al., IEEE Transactions on Knowledge and Data Engineering, vol. 11, No. 1, January/February 1999, Institute of Electrical and Electronic Engineers; "Applications of Video-Content Analysis and Retrieval" by N. Dimitrova et al., IEEE Multimedia, July-September 2002, Institute of Electrical and Electronic Engineers and the therein included references provide an introduction to content analysis.

Thus in some embodiments, the determination of content may be used to determine estimates of the background content information for a given visual content signal. For example, if it is determined that the visual content signal relates to a football match a surround image comprising e.g. spectators or flags associated with the teams may be generated. If the category is determined as cartoons, strong primary colours may be used in the surround image.

In some embodiments, a simplified content analysis may be performed which simply determines visual characteristics of different image segments. For example, a content analysis may be performed to determine the contents of the image. Hence, for example object identification or recognition of image objects may be used to generate background content information. For example, an object detection algorithm may determine that the image comprises a moving object. Preferably, the object detection is combined with motion estimation and the surround image is generated in response to the estimated motion.

For example, a moving object may be detected and the trajectory of the object in the primary display may be determined. As the object reaches the edge of the primary display, the visual content display apparatus may extrapolate the trajectory and display the continued movement of the object into the surround image.

As further examples, the content analysis and processing may comprise a filtering of the background from the foreground. For example object detection and e.g. pattern recognition may be used to detect objects which can be separated from the background. Examples of parameters that may be determined by the content analysis or processing and which can be used in generating the surround image include the average colour of the background in the image; the intensity or brightness of the image; the duration and frequency of different scenes and dynamic variations in individual clips or scenes.

In the preferred embodiment, the surround image is generated at a lower quality level than that of the primary display. The inventor has realised that e.g. a high spatial resolution is only required for the primary display which is the centre of focus of the viewer. The viewer typically perceives the sharp contours and colours of the image of the primary device (the actual point of focus) while the perception of the background is less sharp (only the coarse contours and colours are perceived at the wider viewing angles).

Accordingly, in the preferred embodiment, the surround image is at a lower spatial resolution than that of the primary display. Indeed, in the preferred embodiment the quality and in particular the resolution of the surround image reduces for increasing distance from the primary display (increasing viewing angle). The reduction does not need to be monotonic but may for example be a step function of the distance to the primary display.

A reduced quality level may for example allow for less computational time being required for extraction of the background content information as less accurate information (lower spatial and dynamic resolution) is required. Furthermore, less storage capacity is required for storing any pre-stored background images. Additionally the equipment for projecting the surround image can be less complex and thus cheaper.

In the preferred embodiment, the projected surround image may further be customised to the specific viewing arrangement and content of the visual content signal.

In the preferred embodiment, the visual content display apparatus is operable to modify the processing parameters and algorithms used for extracting the background content information and for generating the surround image depending on the category (e.g. genre) of the visual content signal. For example, the content that may be enhanced by surround images includes movies/soaps, music concerts, sport games, holiday pictures, documentaries, theatre/plays, animal series and science fiction programmes. For example, a space science fiction scene may be enhanced by a surround image showing approaching space ships and stars on the ceiling.

The processing and the nature of the surround image may depend on the genre of content of the visual content signal. For example, an algorithm that produces a night sky with fireworks may be generated if the content corresponds to an outdoor rock concert whereas a night sky with distant stars and spaceships may be generated if the content corresponds to an outdoor scene at a space station in a science fiction programme.

In the preferred embodiment, the surround image is furthermore generated in response to characteristics of the viewing environment. As a simple example, the surround image is preferably projected such that it provides a brightness less than the primary display but sufficiently bright for clear viewing. As the viewed image will depend on the reflectivity of the surfaces projected on to, as well as the general brightness level in the room, the brightness of the projected image depends on the brightness level and the nature of the surfaces used.

These and other features may for example be detected by sensors including for example a light intensity meter.

Other examples of features that may allow a further customisation and thus enhancing the viewing experience include the following:

The visual content display apparatus may comprise an input for modifying the intensity of the surround image and thus the intensity of the experience. A sensitive person may prefer a slight enhancement whereas a viewer more familiar with the display apparatus may prefer a more enhanced experience. Furthermore, in some embodiments, the visual content signal display apparatus may comprise means for determining a category of the visual content signal and the means for generating the surround image may be operable to generate the surround image in response to the preferred sensitivity as determined by the user.

The visual content display apparatus may comprise an input for changing the dynamics of the surround image.

The visual content display apparatus may comprise a switch to choose the surround image being based on meta-data or image processing/analysis.

The visual content display apparatus may comprise means for determining a user profile reflecting preferred colours and dynamics of the surround image (e.g. rate of switching, colour preference, etc.). For example, if a user has seen a movie four times, a different viewing experience may be desirable at the fifth viewing. In that case, the user profile may be stored and used to control the settings (e.g. a sensitivity level) of the visual content display apparatus for future viewings.

The visual content display apparatus may provide the surround image selectively. For example, the surround image may be provided only when predefined events occur (for example, only when a goal is scored in a football match).

In some embodiments, the surround image may be determined partly in response to processing of transmitted audio and video signals received by sensors, such as a microphone, CCD camera's, etc. These signals may be used in addition to the extraction of information from the visual content signal and/or may be comprised in the visual content signal as an embedded data stream and extracted therefrom. The information that can be extracted from the sensor signals may be similar to that extracted from the visual content of the visual content signal. In addition, environmental aspects may be taken into account, such as the light intensity in the room (day or night, light sources in room), the number of persons in the room, voice recognition to process orders from user (switch to a different genre, or increase the sensitivity, brightness of surround images), adaptation of surround image to happenings (like parties, conversation at background, etc.), self-learning etc.

As a specific example, a visual content display apparatus may be provided as a consumer surround image control box which contains a number of features and control means including for example the following:

Control input for changing the intensity of the surround experience.

Control input for selecting a content genre.

Control input for selecting a content item category

Control input for changing the dynamics of the surround image processing variations.

Control input for controlling a scene contrast.

Control input or automatic means for selecting and/or storing a user profile.

Means for entering a self-learning mode (e.g. measuring or determining characteristics of the operations of the surround image control box such as the number of played scenes, for example succeeding goals in a soccer game can be emphasized in time).

Polarization control means: e.g. for controlling that enhancement occurs only for predefined events.

A Source selector for selecting source information for the surround image processing such as e.g. which information from an audio/video content signal to use (color, intensity, image recognition, etc.).

Control input for controlling an adaptation to the current viewing environment.

A purpose selector for selecting e.g. a purpose of the surround experience thereby allowing the surround images to be selected to most suitably achieve this purpose.

A mood selector.

The invention can be implemented in any suitable form including hardware, software, firmware or any combination of these. However, preferably, the invention is implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with the preferred embodiment, it is not intended to be limited to the specific form set forth herein. Rather, the scope of the present invention is limited only by the accompanying claims. In the claims, the term comprising does not exclude the presence of other elements or steps. Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is no feasible and/or advantageous. In addition, singular references do not exclude a plurality. Thus references to "a", "an", "first", "second" etc do not preclude a plurality.

The invention claimed is:

1. A visual content signal display apparatus comprising:
    means for receiving a visual content signal;
    means for presenting the visual content signal on a primary display;
    means for extracting background content information from the visual content signal;
    means for generating a surround image in response to the background content information; and
    means for displaying the surround image on a secondary display area thereby providing a combined display having an increased viewing angle.

2. The visual content signal display apparatus of claim 1 wherein the means for displaying the surround image is operable to project the surround image on to an external surface of an object.

3. The visual content signal display apparatus of claim 2 wherein the external surface is an internal surface of a room.

4. The visual content signal display apparatus of claim 1 wherein the means for extracting is operable to extract real time background content information from the visual content signal, and the means for generating the surround image is operable to generate a real time surround image in response to the real time background content information.

5. The visual content signal display apparatus of claim 1 wherein the means for extracting is operable to extract the background content information in response to background meta-data comprised in the visual content signal.

6. The visual content signal display apparatus of claim 1 wherein the means for extracting is operable to extract the background content information in response to a content analysis of the visual content signal.

7. The visual content signal display apparatus of claim 6 wherein the content analysis comprises image object recognition.

8. The visual content signal display apparatus of claim 7 wherein the means for generating a surround image is operable to perform motion estimation of an image object and to generate the surround image in response to the motion estimation.

9. The visual content signal display apparatus of claim 1 wherein the background content information comprises a visual characteristic of an image section of the visual content signal proximal to an edge of the primary display; the means for generating the surround image is operable to generate at least a partial surround image having a corresponding visual characteristic; and the means for displaying the surround image is operable to display the partial surround image proximal to the edge.

10. The visual content signal display apparatus of claim 1 wherein the means for generating a surround image is operable to generate the surround image in response to a predetermined image associated with the background content information.

11. The visual content signal display apparatus of claim 10 wherein the means for generating the surround image is operable to generate the surround image in response to a predetermined default image if no valid background content information is determined.

12. The visual content signal display apparatus of claim 1 wherein the means for generating the surround image is operable to generate the surround image at a lower quality than a quality of the display of the content signal on the primary display.

13. The visual content signal display apparatus of claim 1 wherein the means for generating the surround image is operable to generate the surround image with a quality that decreases for increasing distance from the primary display.

14. The visual content signal display apparatus of claim 1 wherein the means for generating the surround image is operable to generate the surround image in response to characteristics of a viewing environment associated with the secondary display area.

15. The visual content signal display apparatus of claim 1 further comprising means for determining a category of the visual content signal and wherein the means for generating the surround image is operable to generate the surround image processing in response to the category.

16. A method of displaying a visual content signal with a visual content display apparatus, the method comprising:
 receiving a visual content signal with a receiver of the apparatus;
 presenting the visual content signal on a primary display;
 extracting background content information from the visual content signal with an extraction processor of the apparatus;
 generating a surround image in response to the background content information with a secondary display processor of the apparatus; and
 displaying the surround image on a secondary display area thereby providing a combined display having an increased viewing angle.

17. The method of claim 16, further comprising storing a plurality of images corresponding to a plurality of background content characteristics, and wherein generating a surround image in response to the background content information includes selecting one of the stored images in response to the extracted background content information.

18. A system comprising:
 a receiver for receiving a visual content signal;
 a primary display processor for processing the visual content signal and for providing an image for display on a primary display;
 an extraction processor for extracting background content information from the visual content signal;
 a second display processor for generating a surround image in response to the extracted background content information; and
 a secondary display for displaying the surround image on a secondary display area surrounding the primary display,
 wherein a combination of the image and the surround image provide a greater viewing angle than the image alone.

19. The system of claim 18, wherein the system stores a plurality of images corresponding to a plurality of background content characteristics, and wherein the second display processor selects one of the stored images in response to the extracted background content information and generates the surround image from the selected stored image.

20. The system of claim 18, wherein the system stores a plurality of images corresponding to a plurality of background content characteristics, and wherein the second display processor selects at least two of the stored images in response to the extracted background content information and generates the surround image from the at least two selected stored images.

* * * * *